United States Patent
Hwang et al.

(10) Patent No.: US 10,602,461 B2
(45) Date of Patent: Mar. 24, 2020

(54) METHOD FOR POWER CONTROL FOR SUPPORTING REDUCED TTI IN WIRELESS COMMUNICATION SYSTEM, AND DEVICE THEREFOR

(71) Applicant: LG ELECTRONICS INC., Seoul (KR)

(72) Inventors: Daesung Hwang, Seoul (KR); Hyunho Lee, Seoul (KR); Yunjung Yi, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/336,091

(22) PCT Filed: Sep. 18, 2017

(86) PCT No.: PCT/KR2017/010188
§ 371 (c)(1),
(2) Date: Mar. 22, 2019

(87) PCT Pub. No.: WO2018/056657
PCT Pub. Date: Mar. 29, 2018

(65) Prior Publication Data
US 2019/0215784 A1 Jul. 11, 2019

Related U.S. Application Data

(60) Provisional application No. 62/398,501, filed on Sep. 22, 2016, provisional application No. 62/401,241, (Continued)

(51) Int. Cl.
*H04W 52/34* (2009.01)
*H04W 72/10* (2009.01)
(Continued)

(52) U.S. Cl.
CPC ......... *H04W 52/34* (2013.01); *H04W 52/346* (2013.01); *H04W 52/38* (2013.01);
(Continued)

(58) Field of Classification Search
CPC . H04W 52/146; H04W 52/34; H04W 52/346; H04W 52/367; H04W 52/38; H04W 72/04; H04W 72/10; H04W 72/14
(Continued)

(56) References Cited

U.S. PATENT DOCUMENTS

| 2005/0286449 | A1* | 12/2005 | Seo | ............... | H04B 7/2656 |
| | | | | | 370/280 |
| 2011/0171992 | A1* | 7/2011 | Seo | ............... | H04W 52/10 |
| | | | | | 455/522 |

(Continued)

OTHER PUBLICATIONS

PCT International Application No. PCT/KR2017/010188, Written Opinion of the International Searching Authority dated Dec. 14, 2017, 22 pages.
(Continued)

*Primary Examiner* — Tan H Trinh
(74) *Attorney, Agent, or Firm* — Lee, Hong, Degerman, Kang & Waimey

(57) ABSTRACT

The present application discloses a method for transmitting uplink signals through multiple cells in a wireless communication system. Particularly, the uplink signal transmission method comprises: a step of receiving a first downlink signal at a first timing through a first cell and receiving a second downlink signal at a second timing through a second cell; a step of transmitting a first uplink signal, corresponding to the first downlink signal, through the first cell after a first processing time has elapsed since the first timing; and a step of transmitting a second uplink signal, corresponding to the second downlink signal, through the second cell after a second processing time has elapsed since the second timing,
(Continued)

wherein, if the first uplink signal and the second uplink signal are transmitted at the same timing, uplink transmission power is allocated first to the uplink signal corresponding to the downlink signal received at the preceding timing between the first timing and the second timing.

10 Claims, 9 Drawing Sheets

Related U.S. Application Data filed on Sep. 29, 2016, provisional application No. 62/454,004, filed on Feb. 2, 2017.

(51) Int. Cl.
*H04W 72/14* (2009.01)
*H04W 52/14* (2009.01)
*H04W 52/38* (2009.01)
*H04W 72/04* (2009.01)
*H04W 52/36* (2009.01)

(52) U.S. Cl.
CPC ............ *H04W 72/04* (2013.01); *H04W 72/10* (2013.01); *H04W 72/14* (2013.01); *H04W 52/146* (2013.01); *H04W 52/367* (2013.01)

(58) Field of Classification Search
USPC ..... 455/67.11, 69, 15, 443, 450, 452.1, 464, 455/522; 370/280, 329, 331, 336
See application file for complete search history.

(56) References Cited

U.S. PATENT DOCUMENTS

| | | | |
|---|---|---|---|
| 2013/0028242 A1* | 1/2013 | Baker ................... | H04L 1/1854 370/336 |
| 2013/0201960 A1* | 8/2013 | Kim ...................... | H04L 1/1861 370/331 |
| 2013/0223366 A1* | 8/2013 | Papasakellariou .... | H04L 5/0007 370/329 |
| 2013/0310102 A1 | 11/2013 | Chao et al. | |
| 2014/0328229 A1* | 11/2014 | Ahn .................. | H04W 56/0005 370/280 |
| 2015/0036604 A1* | 2/2015 | Park ...................... | H04L 5/0037 370/329 |
| 2015/0139080 A1* | 5/2015 | Ellenbeck ................. | H04L 1/00 370/329 |
| 2015/0208358 A1* | 7/2015 | Ahn .................... | H04W 52/146 455/522 |
| 2016/0174170 A1* | 6/2016 | Yang ..................... | H04W 36/22 370/329 |
| 2016/0205635 A1 | 7/2016 | Kwon et al. | |
| 2018/0049165 A1* | 2/2018 | Byun ................ | H04W 72/0446 |
| 2019/0044639 A1* | 2/2019 | Ouchi ................... | H04W 52/18 |
| 2019/0159191 A1* | 5/2019 | Kim ......................... | H04L 5/00 |

OTHER PUBLICATIONS

Panasonic, "UL simultaneous transmission between sTTI and TTI", 3GPP TSG RAN WG1 Meeting #86, R1-166968, Aug. 2016, 2 pages.

* cited by examiner

FIG. 2
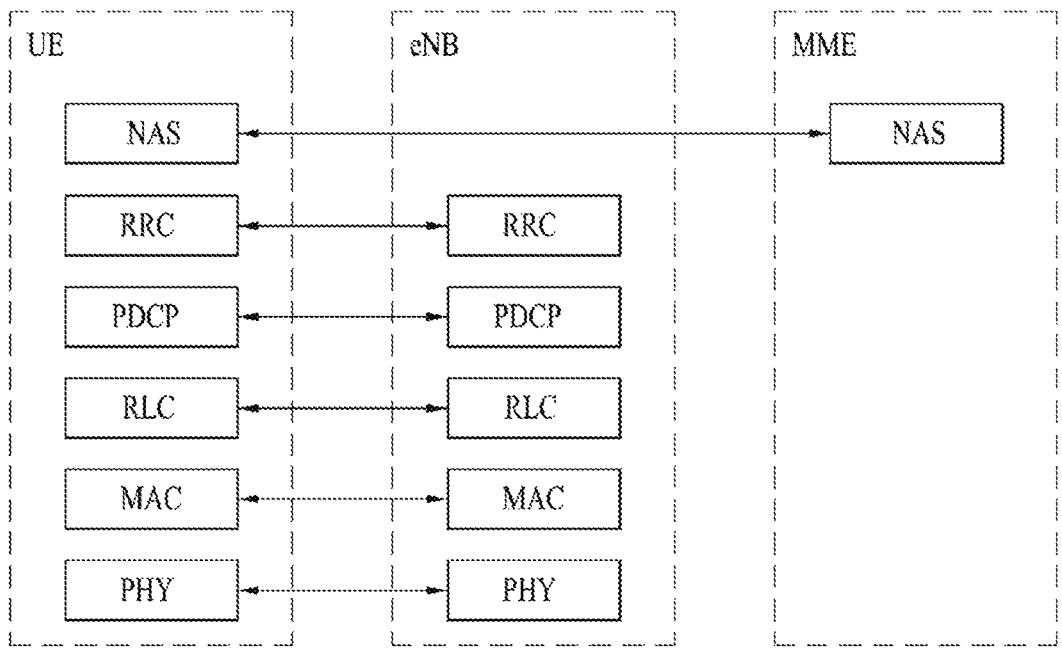
(A) CONTROL-PLANE PROTOCOL STACK
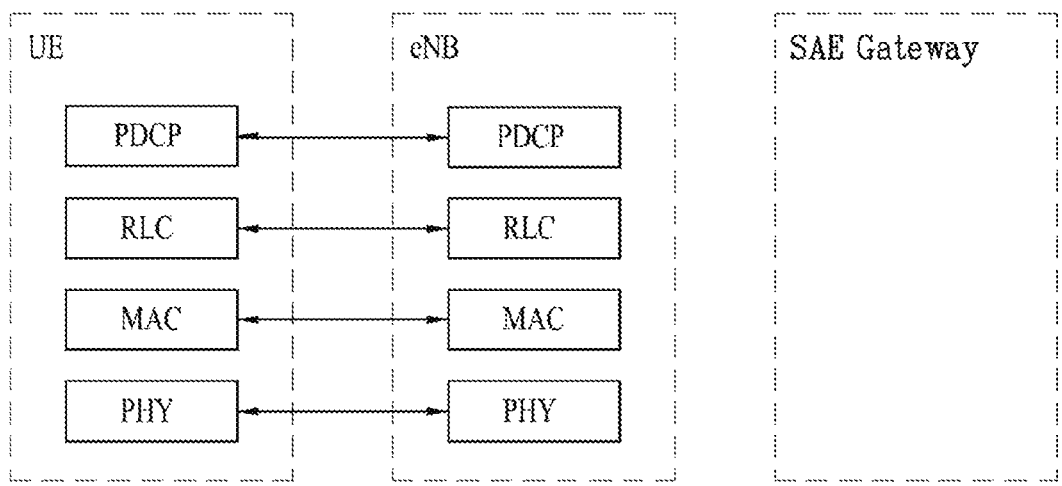
(B) USER-PLANE PROTOCOL STACK

METHOD FOR POWER CONTROL FOR SUPPORTING REDUCED TTI IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR 2017/010188, filed on Sep. 18, 2017, which claims the benefit of U.S. Provisional Application Nos. 62/398,501, filed on Sep. 22, 2016, 62/401,241, filed on Sep. 29, 2016, and 62/454,004, filed on Feb. 2, 2017, the contents of which are all hereby incorporated by reference herein in their entireties.

TECHNICAL FIELD

The present disclosure relates to a wireless communication system, and more particularly, to a method of performing Hybrid Automatic Repeat and reQuest (HARQ) for a shortened Transmission Time Interval (TTI) in a wireless communication system and device therefor.

BACKGROUND ART

A structure of a 3 GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3 GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the above discussion, the present disclosure proposes a power control method for supporting a shortened TTI in a wireless communication system and device therefor.

Technical Solution

In an aspect of the present disclosure, provided is a method of transmitting uplink signals through multiple cells in a wireless communication system. The method may include: receiving a first downlink signal through a first cell at a first time point and receiving a second downlink signal through a second cell at a second time point; receiving a first downlink signal through a first cell at a first time point and receiving a second downlink signal through a second cell at a second time point; after a lapse of a first processing time from the first time point, transmitting a first uplink signal corresponding to the first downlink signal through the first cell; and after a lapse of a second processing time from the second time point, transmitting a second uplink signal corresponding to the second downlink signal through the second cell. In this case, if the first and second uplink signals are transmitted at a same time point, uplink transmission power may be allocated first to an uplink signal corresponding to a downlink signal received at a preceding time point of the first and second time points.

Preferably, if the preceding time point is the first time point, uplink transmission power within maximum uplink transmission power may be allocated to the first uplink signal, and remaining transmission power except the uplink transmission power allocated to the first uplink signal within the maximum uplink transmission power may be allocated to the second uplink signal. More preferably, a maximum value of the uplink transmission power allocated to the first uplink signal may be obtained by subtracting guaranteed transmission power for the second uplink signal from maximum transmission power of a user equipment.

In another aspect of the present disclosure, provided is a user equipment in wireless communication system. The user equipment may include: a wireless communication module; and a processor connected to the wireless communication module. In this case, the processor may be configured to receive a first downlink signal through a first cell at a first time point, receive a second downlink signal through a second cell at a second time point, transmit a first uplink signal corresponding to the first downlink signal through the first cell after a lapse of a first processing time from the first time point, and transmit a second uplink signal corresponding to the second downlink signal through the second cell after a lapse of a second processing time from the second time point. In addition, if the first and second uplink signals are transmitted at a same time point, the processor may be configured to allocate uplink transmission power first to an uplink signal corresponding to a downlink signal received at a preceding time point of the first and second time points.

Preferably, if the preceding time point is the first time point, the processor may be configured to allocate uplink transmission power within maximum uplink transmission power to the first uplink signal and allocate remaining transmission power except the uplink transmission power allocated to the first uplink signal within the maximum uplink transmission power to the second uplink signal. More preferably, a maximum value of the uplink transmission power allocated to the first uplink signal may be obtained by subtracting guaranteed transmission power for the second uplink signal from maximum transmission power of the user equipment.

More specifically, the first and second downlink signals may include uplink grants, respectively, and in this case, the first and second uplink signals may be uplink data signals scheduled by the uplink grants, respectively.

Alternatively, the first and second downlink signals may include downlink data, respectively, and in this case, the first and second uplink signals may be response signals for the downlink data, respectively.

Advantageous Effects

According to the present disclosure, a terminal and a base station can efficiently control power with respect to a shortened TTI in a wireless communication system.

Effects obtainable from the present invention may be non-limited by the above mentioned effect. And, other unmentioned effects can be clearly understood from the following description by those having ordinary skill in the technical field to which the present invention pertains

DESCRIPTION OF DRAWINGS

FIG. 2 is a diagram for structures of control and user planes of radio interface protocol between a 3GPP radio access network standard-based user equipment and E-UTRAN;

BEST MODE FOR INVENTION

Figure 1:
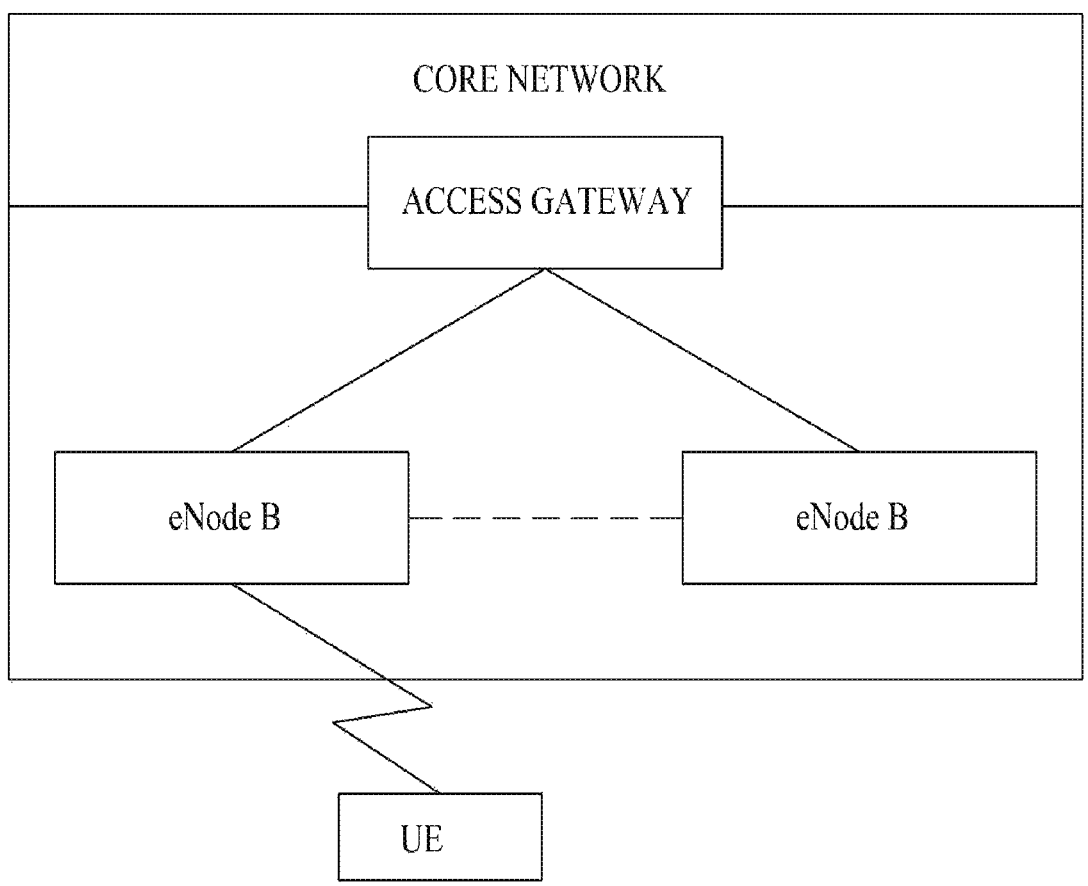
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram showing the structure of a control plane and a user plane of a radio interface protocol between a UE and an E-UTRAN based on the 3 GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
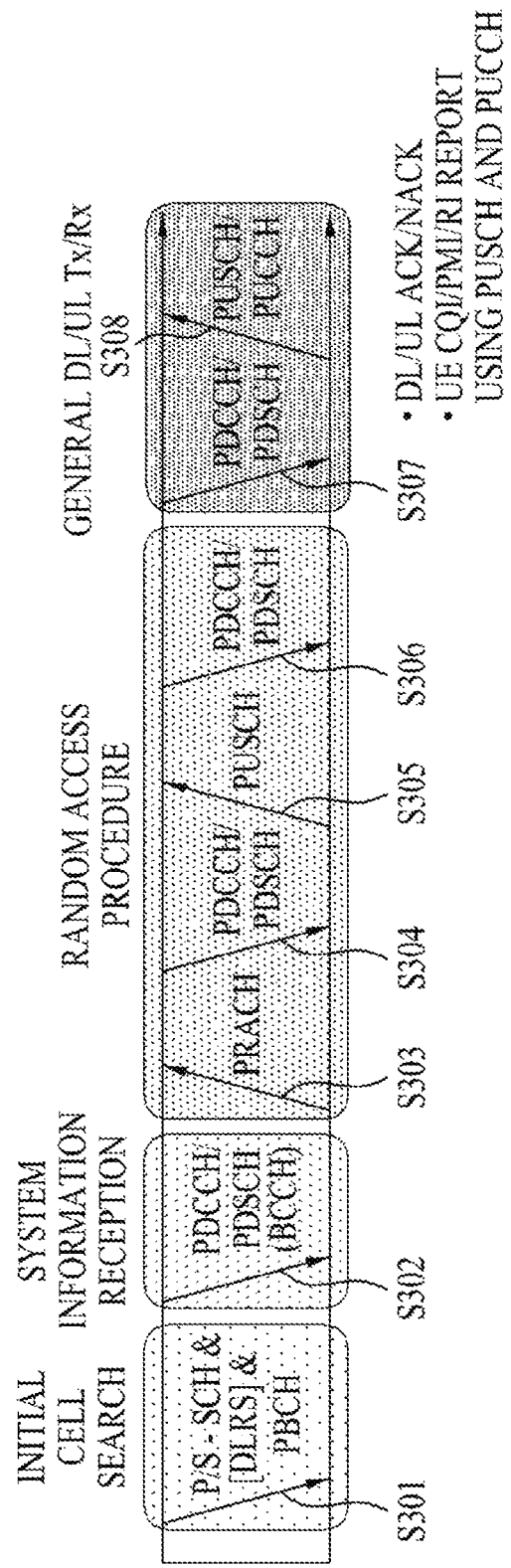
FIG. 3 is a diagram for explaining physical channels used for 3GPP system and a general signal transmission method using the physical channels.

FIG. 3 is a diagram for explaining physical channels used for 3 GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S3061]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3 GPP LTE system, the user equipment may be able to transmit the aforementioned control information such as CQI/PMI/RI and the like on PUSCH and/or PUCCH.

Figure 4:
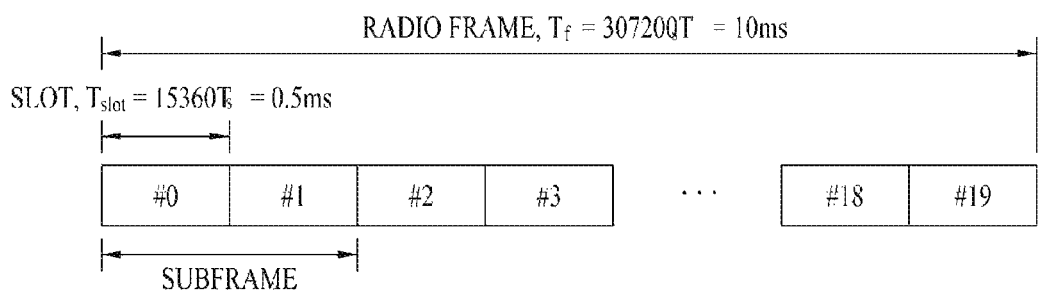
FIG. 4 is a diagram for a structure of a radio frame in LTE system.

FIG. 4 is a diagram for a structure of a radio frame in LTE system.

Referring to FIG. 4, one radio frame has a length of 10 ms (327,200×TS) and is constructed with 10 subframes in equal size. Each of the subframes has a length of 1 ms and is constructed with two slots. Each of the slots has a length of 0.5 ms (15,360×TS). In this case, Ts indicates a sampling time and is represented as Ts=1/(15 kHz×2048)=3.2552× 10−8 (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
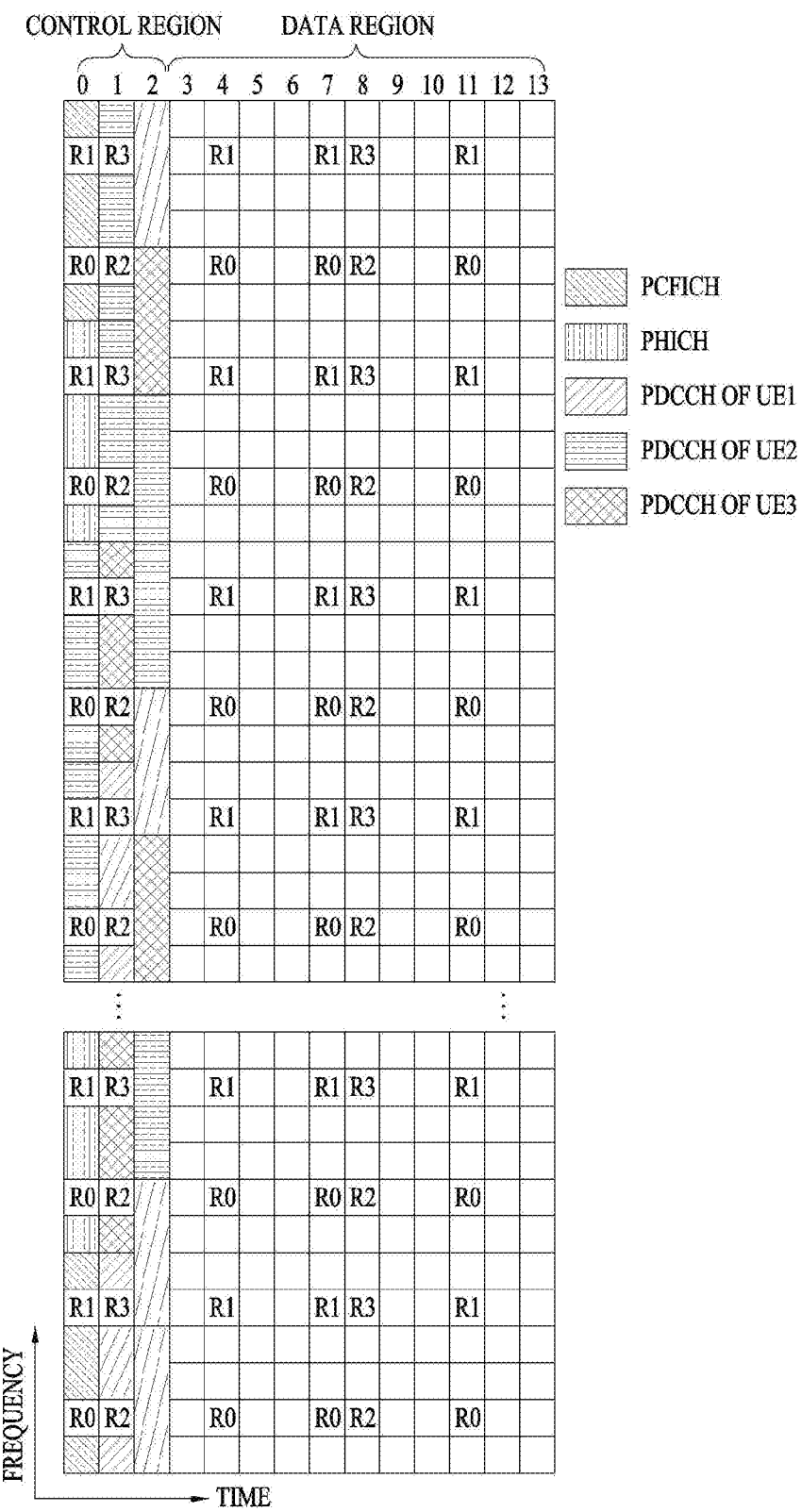
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R0 to R3 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
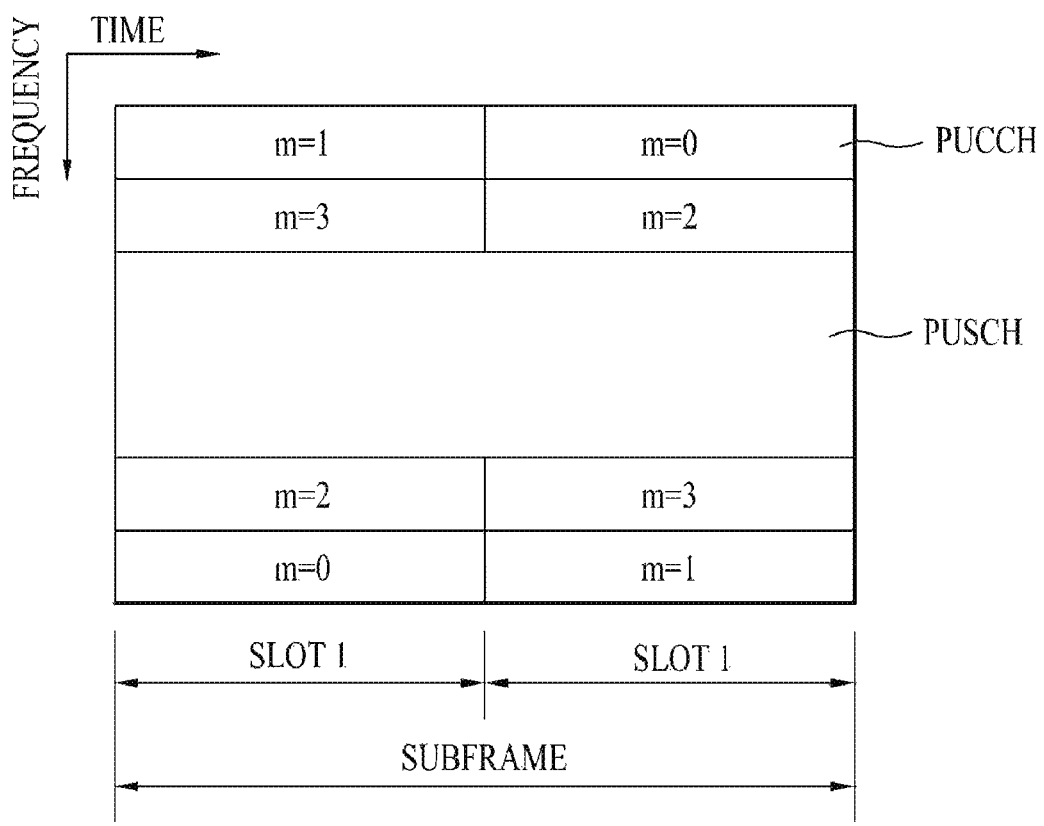
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Figure 7:
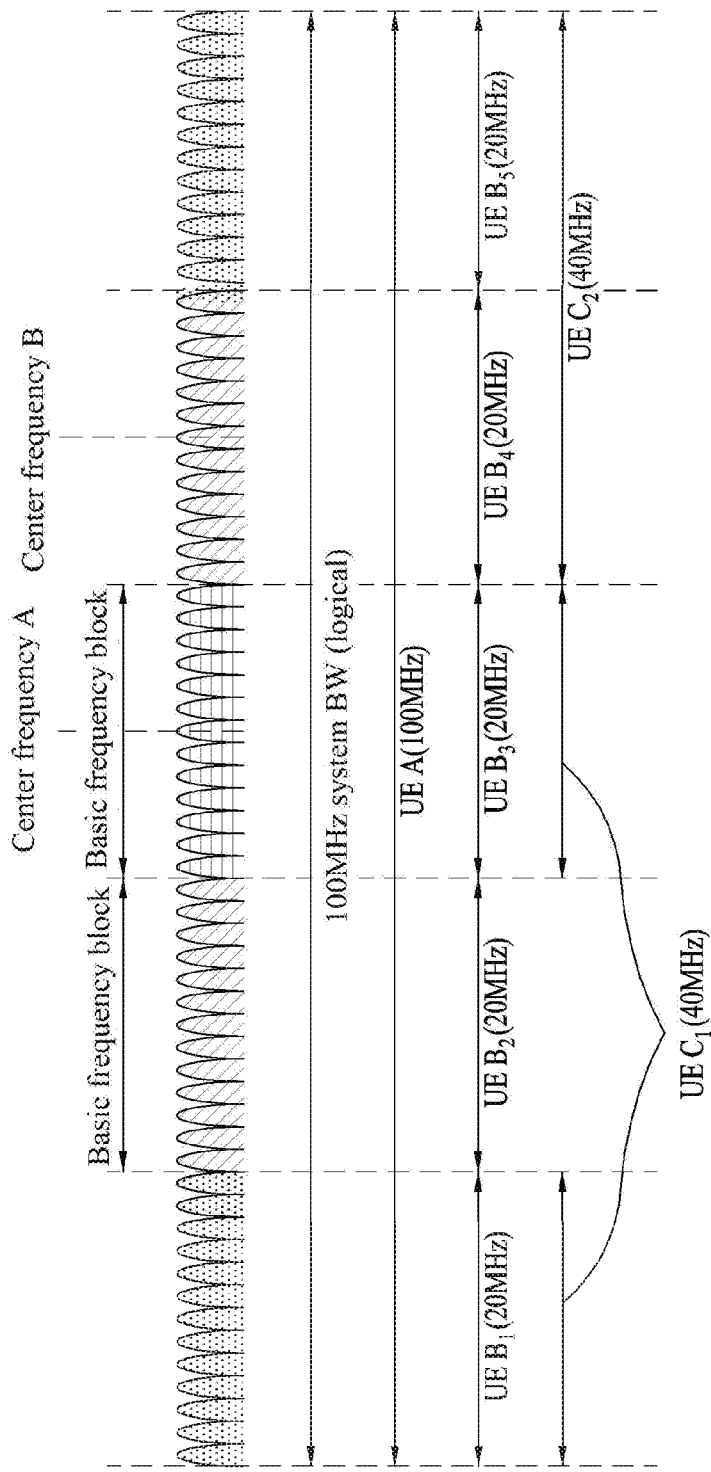
FIG. 7 is a conceptual diagram illustrating carrier aggregation.

FIG. 7 is a conceptual diagram illustrating carrier aggregation. The carrier aggregation means a method by which a UE uses a plurality of frequency blocks or (logical) cells, each of which is composed of uplink resources (or component carriers) and/or downlink resources (or component carriers), as one large logical frequency band in order to obtain a wider frequency band in a wireless communication system. Hereinafter, for convenience of description, the term "component carrier" is commonly used.

Referring to FIG. 7, the entire system bandwidth (BW) has a maximum of 100 MHz as a logical bandwidth. The entire system bandwidth includes five component carriers, each having a maximum bandwidth of 20 MHz. A component carrier includes one or more physically consecutive subcarriers. Although FIG. 7 shows that all component carriers have the same bandwidth, this is merely an example That is, each component carrier may have a different bandwidth. In addition, although FIG. 7 shows that component carriers are adjacent to each other in the frequency domain, it is merely a logical concept. That is, component carriers can be physically adjacent to each other or located apart from each other.

Each component carrier may use a different center frequency, or physically adjacent component carriers may use one common center frequency. For example, assuming that all component carriers are physically adjacent to each other in FIG. 7, center frequency A may be used. On the contrary, assuming that component carriers are not physically adjacent to each other, center frequency A, center frequency B, and the like may be used for the individual component carriers, respectively.

In this specification, a component carrier may mean the system band of a legacy system. By defining the component carrier with respect to the legacy system, it is possible to provide backward compatibility and facilitate system design in a wireless communication environment where evolved UEs coexist with legacy UEs. For example, when the LTE-A system supports the carrier aggregation, each component carrier may correspond to the system band of the LTE system. In this case, the component carrier may have any one of bandwidths of 1.25, 2.5, 5, 10, and 20 MHz.

If an entire system bandwidth is extended by the carrier aggregation, a frequency band used for communication with each UE is defined on a component carrier basis. In this case, UE A may use the entire system bandwidth of 100 MHz and perform communication using all the five component carriers. Each of UEs $B_1$ to $B_5$ may use a bandwidth of 20 MHz only and perform communication using one component carrier. Each of UEs $C_1$ and $C_2$ may use a bandwidth of 40 MHz only and perform communication using two component carries. The two component carriers may or may not be logically/physically adjacent to each other. Here, UE $C_1$ uses two component carriers that are not adjacent to each other, and UE $C_2$ uses two adjacent component carriers.

Meanwhile, a method of scheduling a data channel using a control channel can be classified into a linked carrier scheduling method and a cross carrier scheduling method. Specifically, according to the linked carrier scheduling method, a control channel transmitted on a specific component carrier schedules only a data channel through the specific component carrier as in the legacy LTE system using a single component carrier. On the other hand, according to the cross carrier scheduling method, a control channel transmitted on a primary Component Carrier (CC) schedules a data channel transmitted on the primary component carrier or another component carrier using a Carrier Indicator Field (CIF).

Hereinafter, a method of controlling uplink transmission power in the LTE system will be described.

To control uplink transmission power, a UE uses the following methods: Open-Loop Power Control (OLPC) and Closed-Loop Power Control (CLPC). In the former case, the UE controls its uplink transmission power by estimating the attenuation of a downlink signal from a BS in a cell to which the UE belongs and compensating for the estimated attenuation. That is, the UE increases its uplink transmission power when the downlink signal attenuation increases as a distance between the UE and BS increases. In the latter case, the BS directly transmits information (i.e. control signals) required for the UE to control the uplink transmission power.

Equation 1 below determines transmission power of a UE when serving cell c transmits only a PUSCH in subframe index i in a system supporting the carrier aggregation, instead of simultaneously transmitting the PUSCH and a PUCCH.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c} + f_c(i) \end{array}\right\} [dBm] \quad \text{[Equation 1]}$$

Equation 2 below determines PUSCH transmission power when serving cell c simultaneously transmits a PUCCH and a PUSCH in subframe index i in a system supporting the carrier aggregation.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c} + f_c(i) \end{array}\right\} [dBm] \quad \text{[Equation 2]}$$

The parameters, which will be described with reference to Equations 1 and 2, are to determine the uplink transmission power of the UE in serving cell c. In Equation 1, $P_{CMAX,c}(i)$ indicates the maximum UE transmission power in subframe index i. In Equation 2, $\hat{P}_{CMAX,c}(i)$ indicates the linear value of $P_{CMAX,c}(i)$, and $\hat{P}_{PUCCH}(i)$ indicates the linear value of $P_{PUCCH}(i)$ (where $P_{PUCCH}(i)$ is PUCCH transmission power in subframe index i).

In Equation 1, $M_{PUSCH,c}(i)$ is a parameter indicating the bandwidth for PUSCH resource allocation, which is represented as the number of resource blocks valid for subframe index i, and it is assigned by a BS. In addition, $P_{O\_PUSCH,c}(j)$ is a parameter indicating the sum of a cell-specific nominal component, $P_{O\_NOMINAL\_PUSCH,c}(j)$, which is provided by higher layers, and a UE-specific component, $P_{O\_UE\_PUSCH,c}(j)$, which is provided by higher layers, and it is signaled to the UE by the BS.

If PUSCH transmission/retransmission is performed according to a UL grant, j is set to 1. If the PUSCH transmission/retransmission is performed according to a random access response, j is set to 2. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. In this case, the parameters $P_{O\_PRE}$ and $\Delta_{PREAMBLE\_Msg3}$ are signaled by higher layers.

As a pathloss compensation factor, $\alpha_c(j)$ is a cell-specific parameter provided by higher layers, and it is transmitted as 3 bits from the BS. For j=0 or 1, the following condition is satisfied: $\alpha \in \{0, 0.4, 0.5, 0.6, 0.7, 0.8, 0.9, 1\}$. For j=2, $\alpha_c(j)=1$. The value of $\alpha_c(j)$ is signaled to the UE by the BS.

$PL_c$ is a downlink pathloss (or signal loss) estimate value, which is calculated by the UE in the unit of dB and represented as $PL_c$=referenceSignalPower−higher layer filteredRSRP. Here, referenceSignalPower can be transmitted to the UE by the BS via higher layers.

In addition, $f_c(i)$ is a value indicating the current PUSCH power control adjustment state for subframe index i, and it can be expressed as a current absolute value or accumulated value. When accumulation is enabled based on a parameter provided by higher layers or when $\delta_{PUSCH,c}$ corresponding to a TPC command is included in a PDCCH along with DCI format 0 for serving cell c where a CRC is scrambled with a temporary C-RNTI, the following equation is satisfied: $f_c(i)=f_c(i-1)+\delta_{PUSCH,c}(i-K_{PUSCH})$. In this case, $\delta_{PUSCH,c}(i-K_{PUSCH})$ transmitted in subframe $i-K_{PUSCH}$ through the PDCCH together with DCI format 0/4 or 3/3A. Here, $f_c(0)$ is the first value after reset of the accumulated value.

According to the LTE standard, the values of $K_{PUSCH}$ are defined as follows.

In Frequency Division Duplex (FDD), $K_{PUSCH}$ has a value of 4. In Time Division Duplex (TDD), $K_{PUSCH}$ has the following values shown in Table 1.

TABLE 1

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for the DRX state, a UE attempts to decode a PDCCH of DCI format 0/4 with its C-RNTI or decode a PDCCH of DCI format 3/3A and a DCI format for an SPS C-RNTI with its TPC-PUSCH-RNTI in every subframe. If DCI format 0/4 for serving cell c and DCI format 3/3A are detected in the same subframe, the UE should use $\delta_{PUSCH,c}$ provided in DCI format 0/4. In this case, $\delta_{PUSCH,c}$ is 0 dB for a subframe where no TPC command is decoded for serving cell c, where DRX occurs or where index i is not an uplink subframe in TDD.

The $\delta_{PUSCH,c}$ accumulated values signaled on the PDCCH with DCI format 0/4 are shown in Table 2. If the PDCCH with DCI format 0 is validated through SPS activation or released, $\delta_{PUSCH,c}$ is 0 dB. The $\delta_{PUSCH,c}$ accumulated values signaled on the PDCCH with DCI format 3/3A are one of SET1 shown in Table 2 or one of SET2 shown in Table 3, which are determined by the TCP-index parameter provided by higher layers.

TABLE 2

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH,c}$ [dB] |
|---|---|
| 0 | −1 |
| 1 | 1 |

If a UE reaches the maximum transmission power in serving cell c, $\hat{P}_{CMAX,c}(i)$, positive TPC commands are not accumulated regarding serving cell c. On the contrary, if the UE reaches the minimum transmission power, negative TPC commands are not accumulated.

Equation 3 below shows uplink power control for a PUCCH in the LTE system.

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [\text{dBm}] \quad [\text{Equation 3}]$$

In Equation 3, i indicates a subframe index, and c indicates a cell index. When a UE is configured by higher layers to transmit a PUCCH over two antenna ports, $\Delta_{TxD}(F')$ is provided to the UE by the higher layers. In other cases, $\Delta_{TxD}(F')$ is 0. The following parameters are related to a cell with cell index c.

Here, $P_{CMAX,c}(i)$ is the maximum UE transmission power, $P_{O\_PUCCH}$ is a parameter composed of the sum of cell-specific parameters and provided by the BS through higher layer signaling, and $PL_c$ is a downlink pathloss (or signal loss) estimate value, which is calculated by the UE in the unit of dB and represented as $PL_c$=referenceSignalPower−higher layer filteredRSRP. In addition, h(n) is a value depending on PUCCH formats, $n_{CQI}$ is the number of information bits with respect to Channel Quality Information (CQI), and $n_{HARQ}$ indicates the number of HARQ bits. Moreover, as a relative value for PUCCH format 1a, the value of $\Delta_{F\_PUCCH}(F)$ corresponds to PUCCH format #F, which is provided by the BS through higher layer signaling. Further, g(i) indicates the current PUCCH power control adjustment state of a subframe with index i.

If the value of $P_{O\_UE\_PUCCH}$ is changed by higher layers, g(0)=0. Otherwise, g(0)=$\Delta P_{rampup}$+$\delta_{msg2}$, where $\delta_{msg2}$ is a TPC command indicated by a random access response, and $\Delta P_{rampup}$ corresponds to the total power ramp-up from the first to last preambles provided by higher layers.

If a UE reaches the maximum transmission power in the primary cell, $P_{CMAX,c}(i)$, positive TPC commands are not accumulated regarding the primary cell. On the contrary, if the UE reaches the minimum transmission power, negative TPC commands are not accumulated. The UE resets accumulation when the value of $P_{O\_UE\_PUCCH}$ is changed by higher layers or when a random access response message is received.

Meanwhile, Tables 4 and 5 below shows the values of $\delta_{PUCCH}$ indicated by TPC command fields in DCI formats. In particular, Table 4 shows the $\delta_{PUCCH}$ values indicated by DCI except DCI format 3A, and Table 5 shows the $\delta_{PUCCH}$ values indicated by DCI format 3A.

TABLE 4

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5

| TPC Command Field in DCI format 3A | $\delta_{PUCCH}$ [dB] |
|---|---|
| 0 | −1 |
| 1 | 1 |

To satisfy requirements of various application fields, a situation in which various Transmission Time Intervals (TTIs) can be configured for all physical channels or specific physical channels has been under discussion in a next-generation wireless communication system. In particular, a case in which a TTI for a physical channel such as PDCCH/PDSCH/PUSCH/PUCCH is set to be shorter than 1 msec has been considered in order to reduce communication latency between an eNB and a UE. Hereinafter, a physical channel operating with a TTI shorter than 1 msec is referred to as sPDCCH/sPDSCH/sPUSCH/sPUCCH. Also, for a single UE or a plurality of UEs, multiple physical channels may be present within a single subframe (e.g., 1 msec), and a TTI for each physical channel may be configured independently.

Hereinafter, the present disclosure will be described based on the LTE(-A) system for convenience of description. In the present disclosure, a TTI may include a normal TTI having a length of 1 msec corresponding to the length of a normal subframe and a shortened TTI (S-TTI), which is smaller than the normal TTI, and it may be composed of a single or a plurality of OFDM symbols or SC-FDMA symbols. Although an S-TTI is assumed for convenience of description, the present disclosure can be applied when a TTI is longer than a subframe or equal to or longer than 1 ms. Further, it is apparent that the principles of the present disclosure are also applicable to a system (e.g., New RAT) other than LTE. Particularly, an S-TTI can be introduced to the next-generation wireless communication system by increasing subcarrier spacing. In the present disclosure, it is assumed that there are an S-TTI (<1 msec), a normal TTI (=1 msec), and an L-TTI (>1 msec).

In addition, an operation of decreasing the downlink-uplink timing (e.g., the time required for transmitting downlink HARQ feedback after transmission of downlink data or the time required for transmitting uplink data after transmission of an uplink grant) can be introduced while maintain a TTI of 1 ms as in the legacy LTE system, and this operation can be referred to as 'shortened processing time operation'.

When a UE operates in Carrier Aggregation (CA) mode or Dual Connectivity (DC) mode, the UE may be configured with a plurality of serving cells. In this case, the assumption and configuration for a shortened processing time and/or the assumption and configuration for an S-TTI may vary for each serving cell. In addition, the UE needs to consider the plurality of cells to estimate a processing time during a process for calculating $P_{CMAX}$ or a process for performing uplink power control, and in some cases, the estimated processing time may have an unavailable value. Accordingly, the present disclosure proposes a configuration value for applying a shortened processing time in the CA or DC mode and a method of performing power control.

Although the embodiments of the present disclosure relate to methods of calculating and/or configuring power in the CA or DC mode, the embodiments can be applied when a specific UE is configured with a plurality of processing times, S-TTIs and/or transmission timings in a single cell environment. For example, the principles and methods of the present disclosure can be applied when the transmission time of downlink HARQ feedback (completely or partially) overlap with the transmission time of uplink data in a situation that the time when downlink allocation DCI/PDSCH is transmitted is different from the time when uplink grant DCI is transmitted.

<Application of Shortened Processing Time with CA or DC Mode>

In a next-generation system, a case in which a plurality of serving cells or Cell Groups (CGs) have different downlink TTI lengths, different uplink TTI lengths, different processing times, and/or different downlink-uplink transmission timings may be considered. In particular, when the length of a TTI varies, numerology such as subcarrier spacing may also vary.

In this case, a processing time margin may vary for each serving cell or CG. More specifically, the time at which uplink power is configured or the time at which the maximum UE transmission (transmit) power, $P_{CMAX,c}$ is configured per serving cell may be different or independent. That is, when the CA or DC mode is applied, a specific UE needs to consider all serving cells or CGs when configuring overall power control/power allocation and $P_{CMAX}$. In general, the processing time margin for such a process may significantly depend on a serving cell with the smallest processing time margin among all serving cells, but this approach may not be suitable for a serving cell that requires a relatively large processing time margin.

For example, assuming that two different cells have the same TTI length and different processing times, a first cell may expect downlink HARQ feedback/uplink data in a fourth subframe after transmission of downlink data/uplink grant, and a second cell may expect downlink HARQ feedback/uplink data in a third subframe after transmission of downlink data/uplink grant. Assuming that a specific UE is configured with the first and second cells and operates in the CA or DC mode, the time available for $P_{CMAX}$ calculation and uplink power control may be set to a maximum of 2 ms, and if a Timing Advance (TA) is considered, the time may be shorter than 2 ms. As a result, the first cell may have an insufficient processing time.

Hereinafter, an example of applying a shortened processing time in the CA/DC mode will be described in detail.

(1) It is assumed that when a specific UE operates in the CA or DC mode, the specific UE uses a shortened processing time(s) for all configured, activated, or scheduled serving cells. Under this assumption, a transmission timing according to the shortened processing time may be used, and otherwise, the shortened processing time may not be applied. Particularly, when the DC mode is applied, whether a shortened processing time is applied may be determined per CG. In this case, for each CG, if the shortened processing time is used for all configured, activated, or scheduled serving cells in a corresponding CG, a transmission timing according thereto is applied to the corresponding CG, and otherwise, the shortened processing time may not be applied to the corresponding CG. When the CA mode is applied, if each serving cell uses an independent downlink TTI length and/or an independent uplink TTI length, a downlink-uplink transmission timing may be configured based on a serving cell with the longest processing time among all serving cells. Similarly, when the DC mode is applied, a downlink-uplink transmission timing may be configured per CG based on a serving cell with the longest processing time among all serving cells in a corresponding CG.

For example, assuming that the downlink (or uplink) TTI length of a first cell is set to 7 and the downlink (or uplink) TTI length of a second cell is set to 2, the processing time and downlink-uplink transmission timing may be configured with respect to the first cell. Particularly, the processing time may be reconfigured when a (s)PUCCH transmission timing is configured after transmission of downlink data and/or when scheduling and scheduled cells use different processing times (or downlink-uplink transmission timings).

In this case, if uplink data is transmitted, the reconfigured processing time (or downlink-uplink transmission timing) may be determined with respect to the processing time (or downlink-uplink transmission timing) of the scheduling cell and/or the processing time (or downlink-uplink transmission timing) of the scheduled cell. When the scheduling and scheduled cells are identical (i.e., self-scheduling), a processing time (or downlink-uplink transmission timing) configured for each serving cell may be used. Thereafter, uplink power control may be performed based on combinations of priorities based on UCI types, CGs, CSI processes, cell indices, and/or uplink channel timing orders.

(2) For each serving cell or CG, a shortened processing time, a downlink TTI length and/or an uplink TTI length may be independently configured. When the DC mode is applied, if a processing time is insufficient to perform look-ahead operation between two CGs, a UE may allocate power first to a channel with a high priority based on an uplink channel timing order defined in Power Control Mode 2 (PCM2). Additionally, when power is allocated first to a channel with a high priority, guaranteed power of another CG may be minimized When a shortened processing time, a downlink TTI length, and/or an uplink TTI length is independently configured for each serving cell or CG, the PCM2 can be used for the uplink power control. Alternatively, after modification of the PCM2, the power control may be performed based on a processing time margin or by considering the timing of a downlink channel corresponding to an uplink channel More specifically, when an uplink channel corresponding to a cell with a large processing time margin or a downlink channel corresponding to the uplink channel precedes in time, it is possible to allocate power first to the uplink channel by giving a high priority to the corresponding uplink channel. Here, when it is said that the downlink channel precedes in time, it may mean that the transmission start location or transmission end location of the downlink channel precedes.

For example, when a specific UE is configured with a cell where a downlink HARQ feedback timing after reception of downlink data and/or an uplink data transmission timing after reception of an uplink grant are configured with 3 TTIs and a cell where a downlink HARQ feedback timing after reception of downlink data and/or an uplink data transmission timing after reception of an uplink grant are configured with 4 TTIs, where each of the TTIs has the same length (e.g., 1 ms TTI), if the uplink channel transmission times of the two cells overlap (completely or partially), the priority of an uplink channel of which the timing is 4 TTIs may be set to be higher than that of an uplink channel of which the timing is 3 TTIs. When power allocation is performed, power is allocated first to the uplink channel of which the timing is 4 TTIs according to the priorities regardless of UCI types, cell indices, and/or channel types. Exceptionally, some channels (e.g., PRACH, channels related to a random access procedure, etc.) may have high priorities regardless of processing times.

As a method of guaranteeing power at a low priority, the concept of guaranteed power can be further introduced. Specifically, information on the guaranteed power (e.g., a ratio of the guaranteed power to $P_{CMAX}$) may be independently configured based on a processing time/transmission timing and/or a TTI length through separate higher layer signaling. On the contrary, it may be assumed that an uplink channel with a short processing time has a high priority. Alternatively, it may be assumed that regardless of processing times, an uplink channel transmitted earliest in subframe #n has a high priority and is allocated power first.

(3) If uplink channels of multiple cells collide with each other due to scheduling, a power control method is determined based on whether a shortened processing time is applied to a corresponding serving cell, the configuration of a downlink TTI length, and/or the configuration of an uplink TTI length. For example, when multiple uplink channels collide at the same time, if corresponding serving cells have different processing times and/or downlink and/or uplink TTI configurations, the modified PCM2 is applied as described above in (2). Otherwise, uplink power control is performed based on combinations of priorities based on UCI types, CGs, CSI processes, cell indices, and/or uplink channel timing orders as described above in (1).

(4) If a shortened processing time is configured for at least one serving cell among cells where the CA mode or DC mode is applied, there may be a limitation on the maximum TA for a corresponding UE. In this case, the look-ahead operation may be allowed by configuring power using a time region secured by limiting the TA.

Meanwhile, for proper power control, $P_{CMAX}$ needs to be calculated as well. Since in the DC mode, the look-ahead operation is assumed in calculating $P_{CMAX}$, a Maximum Power Reduction (MPR) value needs to be estimated based on scheduling from a plurality of CGs or serving cells. To this end, the maximum TA is limited for the purpose of securing a processing time. If shortened processing times are configured for all cells configured for the CA/DC mode or if the same or similar TTI lengths are configured, it is possible to obtain a sufficient processing time without any additional work. Otherwise, some limitations or changes in the $P_{CMAX}$ calculation method need to be considered.

For example, in the case of the CA mode, if whether a shortened processing time is applied is differently/independently configured per cell on the assumption of the same TTI (e.g., 1 ms TTI), the maximum TA needs to be limited. When a shortened processing time is configured for at least one cell in a Timing Advance Group (TAG) or a CG, the maximum TA may be limited. Specifically, the maximum TA may be configured, for example, as 4096 $T_s$ (where $T_s$ is a sampling time and has a value of 1/15000/2048 sec) at a similar level to the DC mode. As another method, in the case of the CA mode, by considering that there is a margin between uplink transmission timings of different cells, an overlapping part can be handled by UE implementation.

Meanwhile, in the case of the DC mode, since a TA cannot be reduced, a method of considering no look-ahead operation in calculating $P_{CMAX}$ may be considered. For example, if a shortened processing time or an S-TTI length is configured in the DC mode, $P_{CMAX}$ may be calculated based on a processing time margin or by considering the timing of a downlink channel corresponding to an uplink channel In other words, $P_{CMAX}$ may be calculated based on a large processing time margin or scheduling information of a serving cell of which the downlink channel timing is early. Alternatively, $P_{CMAX}$ may be configured to be semi-statically divided by cell groups with different processing times and then used. That is, when the look-ahead operation is impossible due to different processing times, $P_{CMAX}$ is divided into $P_{CMAX,p,g}$, which can be used by a group with the same processing time, so that $P_{CMAX}$ may not be shared by groups with different processing times. It can be applied to relationship between an S-TTI and an L-TTI. Further, $P_{CMAX}$ may be divided and used for a case where the look-ahead operation is available and a case where it is unavailable.

<Modified PCM2>

Hereinafter, embodiments of power allocation methods when a shortened processing time is differently or independently configured for each serving cell will be described.

For convenience of description, it is assumed that the CA mode is applied or serving cells are synchronized (that is, a difference between downlink/uplink timings of cells is less than a specific threshold). In addition, it is assumed that a normal processing time is applied to a first serving cell and a shortened processing time is applied to a second serving cell. Specifically, in the first serving cell, if downlink data or an uplink grant is transmitted in subframe #n, downlink HARQ feedback or uplink data corresponding thereto may be transmitted in subframe #(n+4). In the second serving cell, if downlink data or an uplink grant is transmitted in subframe #n, downlink HARQ feedback or uplink data corresponding thereto may be transmitted in subframe #(n+3).

Figure 8:
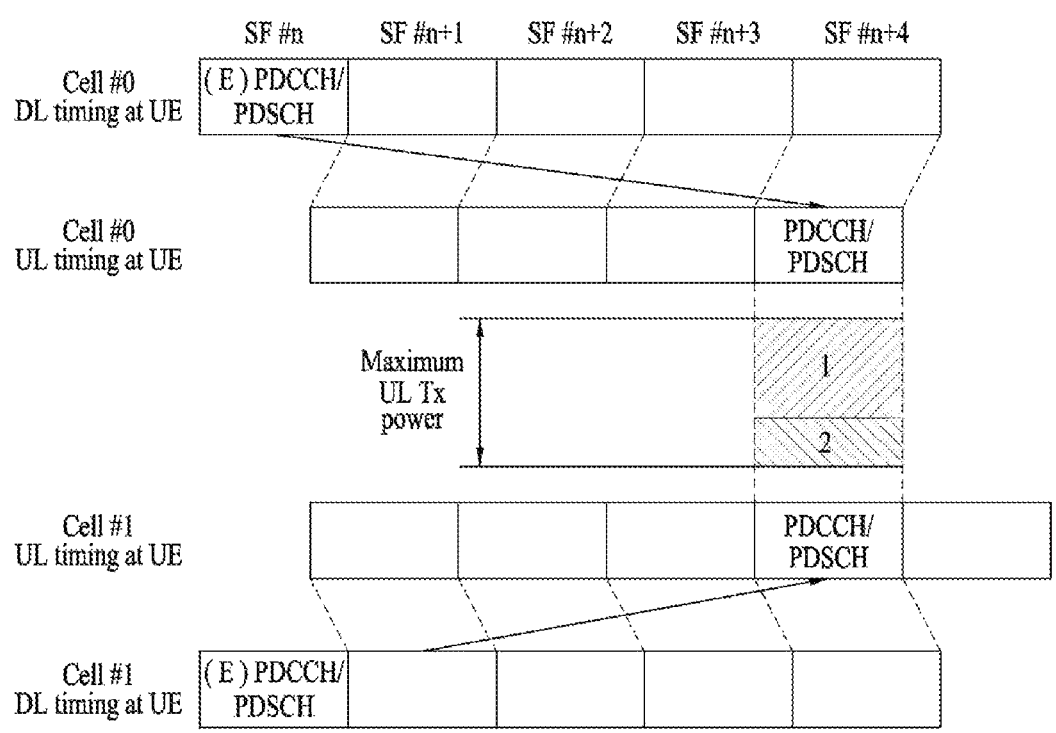
FIG. 8 is a diagram illustrating modified Power Control Mode 2 (PCM2) according to an embodiment of the present disclosure.

FIG. 8 illustrates modified PCM2 according to an embodiment of the present disclosure.

Referring to FIG. 8, priorities are determined by considering processing times. That is, a high priority is given to an uplink channel for the first serving cell with a relatively long processing time, and a low priority is given to an uplink channel for the second serving cell with a relatively short processing time. Thereafter, power allocation may be performed based on the priorities. Specifically, a downlink channel transmitted in subframe #n of the first serving cell precedes a downlink channel transmitted in subframe #(n+1) of the second serving cell, power is allocated first to the uplink channel for the first serving cell. Then, power is allocated to the uplink channel for subframe #(n+1) of the second serving cell.

To allocate a certain level of power to each uplink channel, guaranteed power can be further considered. That is, when power is allocated to an uplink channel for a specific cell, minimum power allocation is guaranteed for a different uplink channel (for a different cell). There may be a difference between uplink channel transmission timings of the two serving cells, and in this case, an uplink subframe of one cell may overlap with two uplink subframes of the other cell. In this overlapping region, it is possible to reduce the power of the uplink channel for the first serving cell or control the power of the uplink channel for the second serving cell to be less than the maximum power.

In addition, when power of a subframe is determined, not only an overlapping region but also multiple uplink power of a different cell can be considered. For example, if subframe #n of the first serving cell overlaps with subframe #n and subframe #(n+1) of the second serving cell, the uplink power of subframe #(n+1) of the second serving cell may be determined by considering both the uplink power of subframes #n and #(n+1) of the first serving cell.

In a serving cell where a normal processing time is applied, an EPDCCH and/or a PDCCH may be used, whereas in a serving cell where a shortened processing time is applied, only a PDCCH may be used. In addition, when a UE uses a shortened processing time, its maximum TA may be limited. In this case, DCI for the normal processing time, which is transmitted in subframe #n, and DCI for the shortened processing time, which is transmitted in subframe #(n+1), may be decoded at similar times (for example, within several OFDM symbols). Thus, uplink power control may be performed without any additional work as in the CA mode between cells with normal processing times (that is, power allocation may be performed by considering UCI types of uplink channels transmitted in multiple serving cells, channel types, cell indices, etc.).

<TPC Command for Shortened Processing Time>

A plurality of processing times can be configured for a specific UE. In the following description, as a timing regardless of a shortened processing time configuration, a first processing time may mean that in FDD, if downlink data or an uplink grant is transmitted in subframe #n or TTI #n, downlink HARQ feedback or uplink data corresponding thereto is transmitted in subframe #(n+4) or TTI #(n+4). In TDD, it is a minimum of 4 ms but may become longer than 4 ms depending on actual downlink/uplink subframe configurations. A second processing time is defined as a timing obtained by applying a shortened processing time. For example, it may mean that in FDD, if downlink data or an uplink grant is transmitted in subframe #n or TTI #n, downlink HARQ feedback or uplink data corresponding thereto is transmitted in subframe #(n+3) or TTI #(n+3). In TDD, it is a minimum of 3 ms but may become longer than 3 ms depending on actual downlink/uplink subframe configurations. In addition, the second processing timing may vary depending on S-TTI configurations.

In a single cell, the first processing time may be used when the fall-back operation (for example, an operation of scheduling a PDSCH/PUSCH using DCI detected in a Common Search Space (CSS), an operation of scheduling a PDSCH using DCI format 1A, and/or an operation of scheduling a PDCCH masked with an existing RNTI) is performed. In addition, the second processing time may be used when a shortened processing time is applied (for example, when a PDSCH/PUSCH is scheduled using DCI detected in a UE-specific Search Space (USS), when a PDSCH is scheduled using DCI depending on transmission modes, and/or when a PDCCH masked with a third RNTI is scheduled). Moreover, in a multi-cell environment, that is, when the CA or DC mode is applied, a different shortened processing time may be applied for each cell.

Simply, even though a shortened processing time is applied, the time at which a TPC is applied may not be changed. However, this method may be inefficient or unsuitable for absolute TPC where power is configured through an uplink grant corresponding to a PUSCH.

As another method, a TPC procedure may be independently configured for each processing time. For example, independent TPC procedures may be performed on a PUSCH (or PUCCH) for a processing time based on timing #(n+4) and a PUSCH (or PUCCH) for a processing time based on timing #(n+3). In the case of accumulative TPC, TPC commands are not accumulated, but TPC accumulation may be performed per processing time.

Meanwhile, since an interference environment is not changed even though a processing time varies, a single TPC procedure may be established to allocate power between uplink channels with different processing times. First, in the case of the absolute TPC, TPC included in an uplink grant may indicate that the power configuration of a PUSCH scheduled by the corresponding uplink grant is maintained. Specifically, the power of a PUSCH scheduled by an uplink grant to which the first processing time (fall-back operation or scheduling by CSS DCI) is applied may be configured based on TPC earlier by 4 ms, which was used to transmit the corresponding uplink grant, and the power of a PUSCH scheduled by an uplink grant to which the second processing time (shortened processing operation or scheduling by USS DCI) is applied may be configured based on TPC earlier by 3 ms, which was used to transmit the corresponding uplink grant.

Although the present disclosure is described based on a PUSCH for convenience of description, the principles of the present disclosure can be applied when an S-TTI is applied (that is, an SPUSCH is transmitted) or when subcarrier spacing/TTI is changed in other communication systems including the new RAT system.

A case in which a PUSCH scheduled by an uplink grant corresponding to the first processing time and a PUSCH scheduled by an uplink grant corresponding to the second processing time collide with each other at the same time may be considered. In the case of the fall-back operation, considering ambiguity between an eNB and a UE, it cannot be guaranteed that the second processing time is always applied. Thus, the PUSCH and the uplink grant corresponding to the first processing time (fall-back operation or CSS DCI) may be selected. As another method, by assuming that the reconfiguration of a processing time is applied since it is scheduled by an eNB, the PUSCH and the uplink grant corresponding to the second processing time may be selected. Of course, it is also assumed that PUSCHs with different processing times do not collide with each other at the same timing.

In the case of accumulative TPC, transmission power of a PUCCH or PUSCH may be updated using multiple TPC. That is, when the first processing time is applied to downlink data or an uplink grant corresponding to a PUCCH or PUSCH (when the fall-back operation is applied or when the scheduling is performed by CSS DCI), uplink power may be configured based on multiple TPC with respect to the first processing time (for example, with respect to 4 ms or timings therebefore in FDD). On the other hand, when the second processing time is applied to downlink data or an uplink grant corresponding to a PUCCH or PUSCH (when the shortened processing time is applied thereto or when the scheduling is performed by USS DCI), uplink power may be configured based on multiple TPC with respect to the second processing time (for example, with respect to 3 ms or timings therebefore in FDD).

When a PUSCH scheduled by an uplink grant corresponding to the first processing time and a PUSCH scheduled by an uplink grant corresponding to the second processing time collide with each other at the same time, one of the two uplink grants may be dropped. In particular, considering the fall-back operation, the uplink grant corresponding to the first processing time may be used, and the other uplink grant may be dropped. Of course, the uplink grant corresponding to the second processing time may be used in an inverse manner. More particularly, when the uplink grant corresponding to the first processing time is dropped, the TPC included in the corresponding uplink grant may be dropped as well, but in the case of the accumulative TPC, the TPC can be used instead of dropped.

A case in which a PUCCH corresponding to downlink data corresponding to the first processing time and a PUCCH corresponding to downlink data corresponding to the second processing time collide with each other at the same time may be considered as well. As similar to the PUSCH case, only a PUCCH for a specific processing time may be transmitted and the other PUCCH may be dropped. For example, the PUCCH for the first processing time may be transmitted, and the PUCCH for the second processing time may be dropped together with UCI. Alternatively, the PUCCH for the second processing time may be transmitted based on the most recently transmitted downlink data, and the PUCCH for the first processing time may be dropped. In particular, when the PUCCH for the first processing time is dropped, TPC that is transmitted when downlink data corresponding thereto is scheduled may be dropped. Alternatively, the TPC may be used when the transmission power of the PUCCH for the second processing time is configured. As another method, UCI for the first processing time and UCI for the second processing time may be simultaneously transmitted on a single PUCCH. In particular, the single PUCCH may be the PUCCH corresponding to the second processing time. In this case, if necessary, bundling may be performed to reduce the amount of UCI. Further, in the case of the accumulative TPC, it may be desirable that the above operation is performed with respect to the second processing time. Of course, it may be assumed and configured that PUSCHs/PUCCHs with different processing times do not collide with each other at the same timing.

More particularly, in the case of TPC transmitted in a CSS such as DCI format 3/3A, the corresponding TPC may be applied after 4 ms from the time when the corresponding TPC is transmitted. If a TPC procedure is performed independently depending on types of processing times, DCI format 3/3A may exist separately for each processing time. Alternatively, TPC for each processing time may be configured for each UE when DCI format 3/3A is configured. The method of separately configuring DCI format 3/3A per processing time could be interpreted to mean that a TPC-PUCCH-RNTI and/or a TPC-PUSCH-RNTI may exist for each processing time.

Meanwhile, when a TTI is configured to have a short length, a power transient period may significantly fluctuate between S-TTIs. As a result, performance may be significantly degraded due to signal distortion. To avoid this significant performance degradation, constant resource allocation and/or uplink transmission power need to be supported in a subframe, a specific S-TTI, or a symbol period. However, depending on UE capability, resource allocation and power may be changed per S-TTI.

In the case of resource allocation, to minimize a power transient period, a scheduler may not change the corresponding value for the same UE. In the case of power control, it is assumed that a factor related to pathloss is constant within a subframe, an S-TTI group, or a symbol group. Alternatively, it may be adjusted by TPC. In the case of the absolute TPC, the same value may be indicated if necessary. In the case of the accumulative TPC, an update value may be indicated at the beginning of a subframe, and the TPC value may be set to 0 after the beginning thereof. However, if TPC for initial uplink transmission is missing, power control may become inefficient. Thus, in the case of the accumulative TPC, the TPC for the same subframe are configured to have the same value, and the values for the previous subframe rather than the previous S-TTI may be accumulated.

As another method, power control or TPC may be shared between different processing times and/or between an S-TTI and 1 ms (i.e., a conventional TTI). For example, in the case of a PDCCH, a TPC timing may be configured by recognizing the first S-TTI in a subframe, and in the case of an EPDCCH, a TPC timing may be configured by recognizing the last S-TTI in a subframe.

When an sPUSCH or an sPUCCH is transmitted, power may be configured using TPC in an sPDCCH or sDCI before a timing configured from the corresponding transmission and/or TPC in an ePDCCH/PDCCH or DCI before a configured timing. In this case, all the configured timings may relate to an S-TTI or a shortened processing time. For example, the timings may be before 4 to 8 S-TTIs. Alternatively, each of the timings may be represented by the number of symbols. As another method, all the configured timings may relate to a normal processing time or 1 ms, and in FDD, the configured timings may be 4 ms or therebefore.

When a PUSCH or a PUCCH is transmitted, if an S-TTI or a shortened processing time is configured, power may be configured using TPC in an EPDCCH/PDCCH (or DCI) before a timing configured from the corresponding transmission and/or TPC in an sPDCCH (or sDCI). In particular, the timing configured for the EPDCCH/PDCCH or DCI may relate to a normal processing time or 1 ms. For example, in FDD, the timing may be 4 ms or therebefore. Alternatively, the timing configured for the EPDCCH/PDCCH may relate to an S-TTI or a shortened processing time. For example, the timing may be before 4 to 8 S-TTIs. Similarly, the timing configured for the sPDCCH or sDCI may relate to a shortened processing time. For example, the timing may be before 4 to 8 S-TTIs.

More particularly, the above method may be applied only when accumulative power control is used. In this case, absolute power control may be determined based on TPC transmitted in DCI or sDCI. For example, when power is configured for a PUSCH or a PUCCH, if an S-TTI or a shortened processing time is applied, accumulative power may be configured based on TPC in an SPDCCH and/or an EPDCCH/PDCCH before a specific time (e.g., 6 S-TTIs) from the time when the PUSCH or PUCCH is transmitted.

Figure 9:
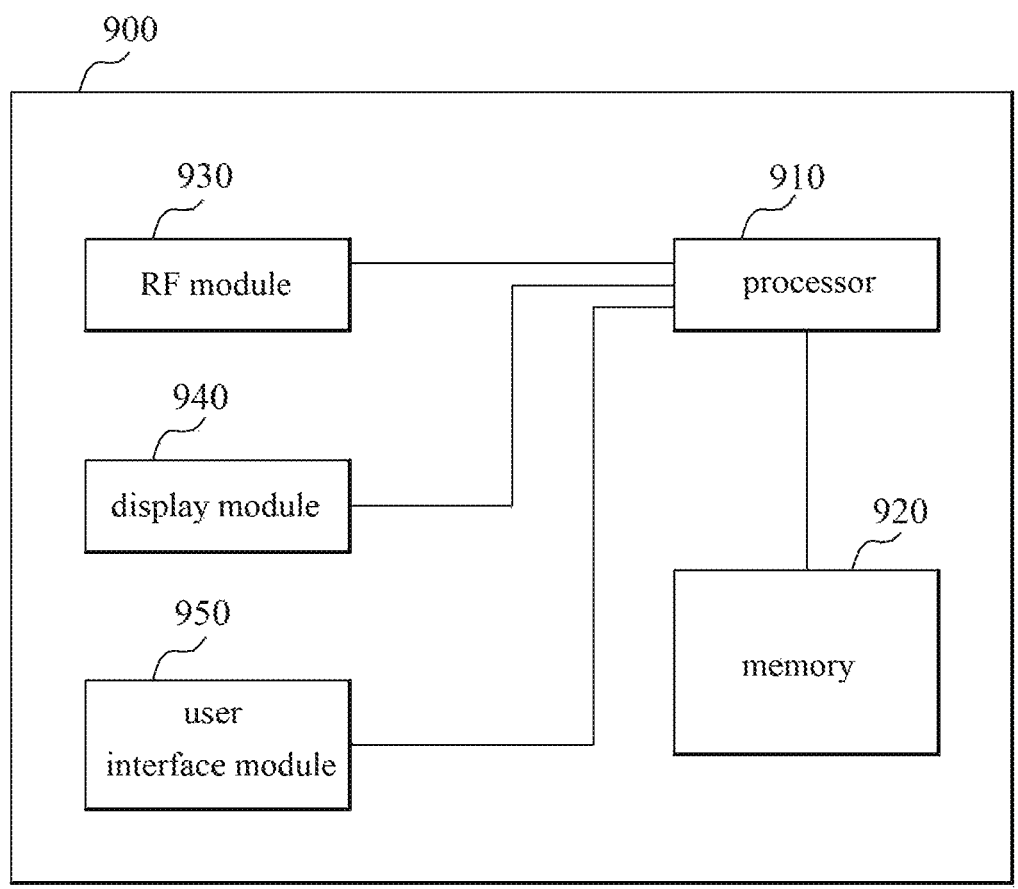
FIG. 9 is a block diagram for an example of a communication device according to one embodiment of the present invention.

FIG. 9 is a block diagram for an example of a communication device according to one embodiment of the present invention.

Referring to FIG. 9, a communication device 900 may include a processor 910, a memory 920, an RF module 930, a display module 940, and a user interface module 950.

Since the communication device 900 is depicted for clarity of description, prescribed module(s) may be omitted in part. The communication device 900 may further include necessary module(s). And, a prescribed module of the communication device 900 may be divided into subdivided modules. A processor 910 is configured to perform an operation according to the embodiments of the present invention illustrated with reference to drawings. In particular, the detailed operation of the processor 910 may refer to the former contents described with reference to FIG. 1 to FIG. 9.

The memory 920 is connected with the processor 910 and stores an operating system, applications, program codes, data, and the like. The RF module 930 is connected with the processor 910 and then performs a function of converting a baseband signal to a radio signal or a function of converting a radio signal to a baseband signal. To this end, the RF module 930 performs an analog conversion, amplification, a filtering, and a frequency up conversion, or performs processes inverse to the former processes. The display module 940 is connected with the processor 910 and displays various kinds of informations. And, the display module 940 can be implemented using such a well-known component as an LCD (liquid crystal display), an LED (light emitting diode), an OLED (organic light emitting diode) display and the like, by which the present invention may be non-limited. The user interface module 950 is connected with the processor 910 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the power control method for supporting a shortened TTI in a wireless communication system and device therefor are described based on the 3 GPP LTE system, the method and device can be applied to various wireless communication systems as well as the 3 GPP LTE system.

What is claimed is:

1. A method of transmitting uplink signals through multiple cells in a wireless communication system, the method comprising:
receiving a first downlink signal through a first cell at a first time point and receiving a second downlink signal through a second cell at a second time point;
after a lapse of a first processing time from the first time point, transmitting a first uplink signal corresponding to the first downlink signal through the first cell; and
after a lapse of a second processing time from the second time point, transmitting a second uplink signal corresponding to the second downlink signal through the second cell,
wherein if the first and second uplink signals are transmitted at a same time point, uplink transmission power is allocated first to an uplink signal corresponding to a downlink signal received at a preceding time point of the first and second time points.

2. The method of claim 1, wherein if the preceding time point is the first time point, uplink transmission power within maximum uplink transmission power is allocated to the first uplink signal, and remaining transmission power except the uplink transmission power allocated to the first uplink signal within the maximum uplink transmission power is allocated to the second uplink signal.

3. The method of claim 2, wherein a maximum value of the uplink transmission power allocated to the first uplink signal is obtained by subtracting guaranteed transmission power for the second uplink signal from maximum transmission power of a user equipment.

4. The method of claim 1, wherein the first and second downlink signals include uplink grants, respectively, and wherein the first and second uplink signals are uplink data signals scheduled by the uplink grants, respectively.

5. The method of claim 1, wherein the first and second downlink signals include downlink data, respectively, and wherein the first and second uplink signals are response signals for the downlink data, respectively.

6. A user equipment in a wireless communication system, the user equipment comprising:
a wireless communication module; and
a processor connected to the wireless communication module,
wherein the processor is configured to receive a first downlink signal through a first cell at a first time point, receive a second downlink signal through a second cell at a second time point, transmit a first uplink signal corresponding to the first downlink signal through the first cell after a lapse of a first processing time from the first time point, and transmit a second uplink signal corresponding to the second downlink signal through the second cell after a lapse of a second processing time from the second time point, and
wherein if the first and second uplink signals are transmitted at a same time point, the processor is configured to allocate uplink transmission power first to an uplink signal corresponding to a downlink signal received at a preceding time point of the first and second time points.

7. The user equipment of claim 6, wherein if the preceding time point is the first time point, the processor is configured to allocate uplink transmission power within maximum uplink transmission power to the first uplink signal and allocate remaining transmission power except the uplink transmission power allocated to the first uplink signal within the maximum uplink transmission power to the second uplink signal.

8. The user equipment of claim 7, wherein a maximum value of the uplink transmission power allocated to the first uplink signal is obtained by subtracting guaranteed transmission power for the second uplink signal from maximum transmission power of the user equipment.

9. The user equipment of claim 6, wherein the first and second downlink signals include uplink grants, respectively, and wherein the first and second uplink signals are uplink data signals scheduled by the uplink grants, respectively.

10. The user equipment of claim 6, wherein the first and second downlink signals include downlink data, respectively, and wherein the first and second uplink signals are response signals for the downlink data, respectively.

* * * * *